Dec. 12, 1950 G. J. LEHMANN 2,533,269

PULSE RADIO COMMUNICATION SYSTEM

Filed June 10, 1943 3 Sheets-Sheet 1

INVENTOR.
GERARD J. LEHMANN

BY Robert J. Berry

AGENT

INVENTOR.
GERARD J. LEHMANN
BY
Robert J. Berry
AGENT

PULSE RADIO COMMUNICATION SYSTEM

Filed June 10, 1943

3 Sheets-Sheet 3

INVENTOR.
GERARD J. LEHMANN

BY Robert J. Berry

AGENT

Patented Dec. 12, 1950

2,533,269

UNITED STATES PATENT OFFICE 2,533,269

PULSE RADIO COMMUNICATION SYSTEM

Gerard J. Lehmann, New York, N. Y., assignor to International Standard Electric Corporation, New York, N. Y., a corporation of Delaware Application June 10, 1943, Serial No. 490,277
In France August 29, 1941

Section 1, Public Law 690, August 8, 1946
Patent expires August 29, 1961

20 Claims. (Cl. 250—15)

This invention relates to improvements in systems of long distance radio communication, and more particularly to long distance radio telephonic transmission systems using very short waves.

In these systems, in order to assure transmission over distance reaching several hundreds of kilometers, it is customary to use relay stations arranged in the form of a chain at elevated points in echelon along the line. These relay stations generally operate without supervision. Each of them receives signals emitted by the preceding station and retransmits them to the next station.

The messages ordinarily transmitted in such communication systems are ordinarily converted by a modulation of amplitude of a carrier wave. In order to separate at each station the modulated wave entering from the modulated retransmission wave going out, the wave lengths should vary on each radio link between two relay stations. Each station must necessarily receive upon one wave length and retransmit upon another wave length.

In the case of commercial telephonic transmissions, these operations of reception and of retransmission must be effected in two directions to provide working both ways, and therefore, the equipment of each relay station must be set up to deal with four wave lengths and generally carries four antennas, two for the reception and two for the retransmission.

The present invention has especially among its objects to provide radio communication systems on very short waves for a single direction of transmission or two directions, in which a single wave length is used for each direction of transmission or for the two directions, all along the path between the terminal stations.

Another object of the invention is to reduce or simplify the equipment of each relay station of such a system, and especially the number of antennas, meanwhile assuring a correct reception and retransmission of the modulated waves.

Still another object of the invention is to provide long distance transmission systems using relay stations whose cost and upkeep may be notably reduced with respect to systems now existing, on the one hand by means of a simplification of the equipment of each station, and on the other hand by means of a standardization of the equipment set up at all the stations in the system.

A further object of this invention is to substitute a modulation by impulses for the modulation of amplitude normally used in long distance radio communication systems on very short waves.

A still further object of this invention is to provide a long distance radio communication system using relay stations arranged to function with a single wave length for a single direction of transmission over the whole path, this single wave being modulated by impulses. Each relay station of such a system only has therefore, according to another characteristic of the invention, but one antenna to receive and retransmit the wave modulated by impulses used for each direction of transmission.

An additional object of the present invention is to provide a system of long distance radio communication incorporating two waves modulated by impulses of the same length in the whole system but of different lengths for each direction of transmission, and each relay station of this system being provided with receiver and retransmittor equipment functioning on these two wave lengths and with a common aerial for the two directions of transmission, capable of receiving the two frequencies used.

According to still another aspect of the invention, a system for long distance radio communications uses a single wave length for the two directions of transmission, the transmitted waves in the two directions being modulated by impulses with different modulation characteristics. Various methods of modulating by impulses may be used for this purpose, according to known technique.

Other objects will become apparent from the following description taken in connection with the attached drawings showing several illustrative embodiments of the invention and wherein.

Figure 1:
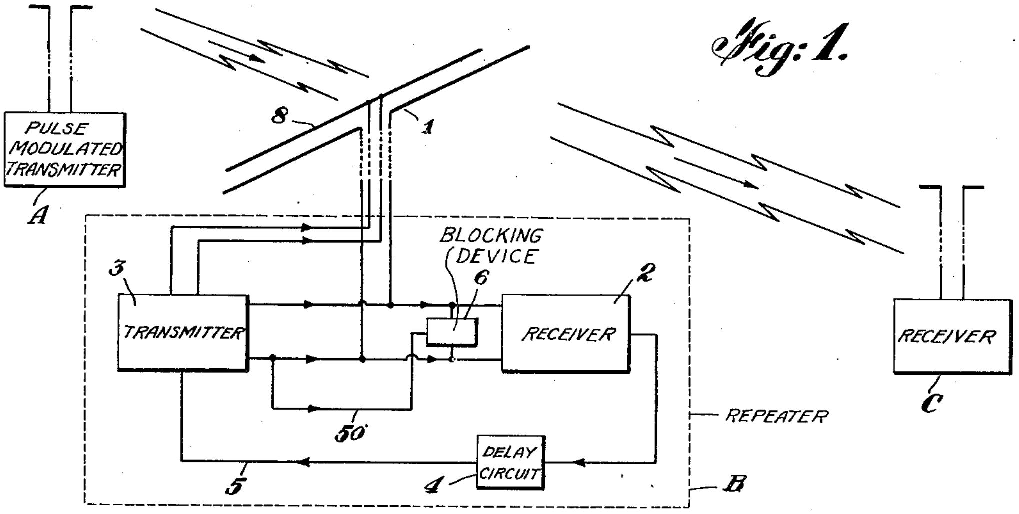
Fig. 1 shows a block circuit diagram of a pulse transmission system for a single direction of transmission, in accordance with the present invention.

In a system using the characteristics of the present invention, each repeater station, as well as the terminal stations of the system, have transmitters and receivers of waves modulated by pulses. In systems having a single antenna for a transmitter and a receiver, if the modulation of the waves were effective in any other way than by pulse modulation, it would be necessary to keep the transmitter blocked during reception periods. But, in the case of a transmitter with pulses, the circuit is normally in a state of rest. It therefore follows that the receiver connected to the same antenna as the transmitter can always be in a condition of receptivity for signals received on the antenna and sent on the same wave length as the associated transmitter. Such a system is illustrated, for example, in Fig. 1 in which A represents a terminal transmitter, C a terminal receiver, and B is representative of one or more repeaters intermediate the stations A and C. The repeated station B of such a system may comprise a single antenna 1 of any appropriate structure having a symmetrical radiation pattern, the two chosen directions being determined, one toward the prior repeater station or end station, and the other toward the next succeeding repeater station or the other end station. To this antenna 1 are connected a receiver 2 and a transmitter 3. As soon as a pulse reaches the receiver 2, it is there amplified and applied through a delay circuit 4, as by conductor 5 to activate the transmitter 3 normally at rest. This transmitter 3 now generates a pulse on the same wave length as the pulse received by the receiver 2, but after a time determined by the constants of the delay circuit 4, and then sends it to the antenna 1 for transmission to the next repeater or end station.

It is necessary that the pulse generated by the transmitter 3 does not reenergize the receiver 2 and thereby cause additional false re-activation of the transmitter. For this purpose means must be provided for blocking the receiver at the time the transmitter 3 is operating. This may be accomplished, for example, by placing a short-circuiting device 6 across the input of the receiver 2, this short-circuiting device being operated by the transmitter 3 as by the conductor 50 connected to the output of the latter. This short-circuiting device which may be a vacuum tube or other known device operated by the transmitter will be preferably spaced across the receiver input at a distance equal to $$\frac{\lambda}{4}$$

from the transmission line to the antenna so that the short-circuiting will not cut out the transmitter as well as the receiver, as will be obvious to those skilled in this art.

Other means for rendering the receiver 2 inoperative during the operation of transmitter 3 are contemplated and are within the knowledge of those skilled in this art. For example, the output of the transmitter can be used to block a tube of the receiver itself, or can apply to an appropriate circuit of the receiver an impulse of opposite direction to that which is applied to it from the transmitter 3 when the latter sends a pulse toward the antenna 1.

In order to avoid an emission of this retransmitted pulse from the antenna 1, whose radiation pattern indicates two preferred directions, toward the repeater station above in the chain where this pulse would be received and would gradually disrupt the working of the entire system, one may provide means for suppressing at the moment of emission of this pulse, a portion of the radiation toward the prior repeater station. As an example of such an arrangement, Fig. 1 shows an additional antenna 8 associated with one side of the bi-directive antenna 1. This antenna 8 is fed by the transmitter 3 at the moment of operation of the latter, in a way well known in the art (see Proceedings of the Institute of Radio Engineers, volume 26, page 17, January 1938) so as to create in the neighborhood of this side of the antenna forming the undesired portion of the radiation pattern, a field substantially equal but of opposite phase to the field normally created on this side of the antenna when the repeater station functions as a transmitter. A manner of obtaining privilege direction of transmission from antenna and changing said privilege direction by means of simple switching operation of associated reflectors is shown for instance in Electrical Communications, January 1937, page 196 and Fig. 3 page 197. As is known in the art, the antenna 8 could be normally detuned relatively to the antenna 1 so as not to interfere with the pattern of the latter during the reception periods. I have, for example, shown the antenna 8 of shorter length than the antenna 1.

Figure 2:
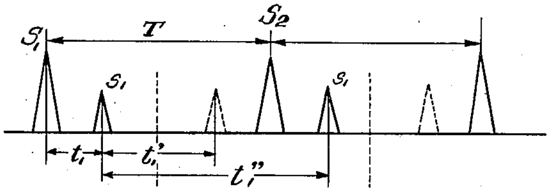
Fig. 2 shows impulses which may be used in the case of a system of radio communication functioning with a wave modulated by impulses of a single frequency for a single direction of transmission in a system of the type illustrated in Fig. 1.

A pulse modulation system adapted to be used in connection with a transmission system such as illustrated in Fig. 1, is shown in Fig. 2. Such a system contemplates utilizing a series of initiating or synchronizing pulses $S_1$, $S_2$, etc., fixed in time at intervals T, and signaling pulses $s_1$, $s_2$, etc., spaced in a variable manner from the synchronizing pulses to define the intelligence indicating signals. The synchronizing pulses may be generated locally at each repeater station and may be suppressed from transmission in a manner well known in the pulse modulation art. The pulse $s_1$ is, for example, spaced at a time $t_1$ from the synchronizing pulse $S_1$. It is this pulse which will be received (alone to simplify the explanation) by the receiver 2 of Fig. 1, and will be retarded after amplification, in the circuit 4 to operate the transmitter 3.

All the pulses $s$ will thus be retarded by an identical time in the circuit 4. If this time of retardation is less than one-half of the interval T between two synchronizing pulses as, for example, $t'_1$, the dotted pulse $s'_1$ representing the pulse retransmitted from the antenna 1, the retransmission will be effected before the occurrence of the next synchronizing pulse $S_2$; if this time is greater than this half of interval T, the pulse will be retransmitted a time $T''_1$ after its arrival on the receiver 2, later than the synchronizing pulse $S_2$; it is possible that this instant may coincide with the instant of arrival of subsequent signaling pulse $s_2$, this however, will happen sufficiently seldom so as not to disturb the effective functioning of the system. It may be completely eliminated, however, by reducing the extent of modulation of the pulses to one-half of the total value T, in other words by only using signaling pulses spaced beyond the associated synchronizing pulse by a time T/2, and by adjusting the retardation of re-transmission determined by the circuit 4 to a value itself equal to T/2 or an odd multiple of T/2.

Figure 3:
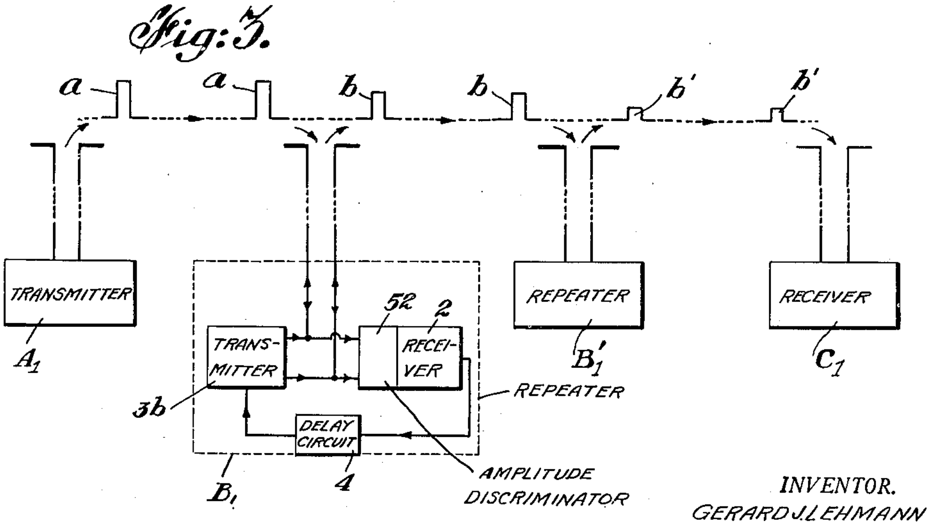
Fig. 3 is a block circuit diagram of another pulse modulated single directional transmission system.

Another system by which the proper directional effect of the retransmitted pulses can be obtained with a single simple antenna is illustrated in Fig. 3. In this case, one terminal station $A_1$ transmits pulse modulated signals having a certain amplitude *a*. Each repeater station such as station $B_1$ will, in this case, include a receiver 2 operating a transmitter 3*b* through a delay circuit 4, the transmitter 3*b* in this case retransmitting these same pulses at a lower amplitude *b*. Between the antenna and the receiver 2 is placed means such as an amplitude discriminator circuit 52 (which may also be directly embodied in the receiver itself) which makes the receiver 2 insensitive to all signals below those having the amplitude *a*. Thus, the signals retransmitted by the transmitter 3*b* having a smaller amplitude than the pulses *a* will not be impressed upon the receiver 2 and a false energization of the transmitter 3*b* will be avoided. The second relay station $B_1'$ will respond to signals of amplitude *b* but will re-transmit signals of less amplitude *b'*. The end station $C_1$ will be sufficiently sensitive to receive small pulses *b'*. However, it will be impossible for the receiver of repeater $B_1$ to become confused by the transmission of signals from the second repeater $B_1'$ since the receiver of the prior repeater will be insensitive to the small amplitude signals *b'*. Thus a uni-directional system is assured without the necessity of directly operating upon the radiation pattern of the antenna, as previously described in connection with Fig. 1 and such a system will be adapted for wired transmission as well as radio transmission. Time modulation of the pulses in the manner previously described in connection with Figs. 1 and 2 may, of course, be still utilized in the system shown in Fig. 3.

Figure 4:
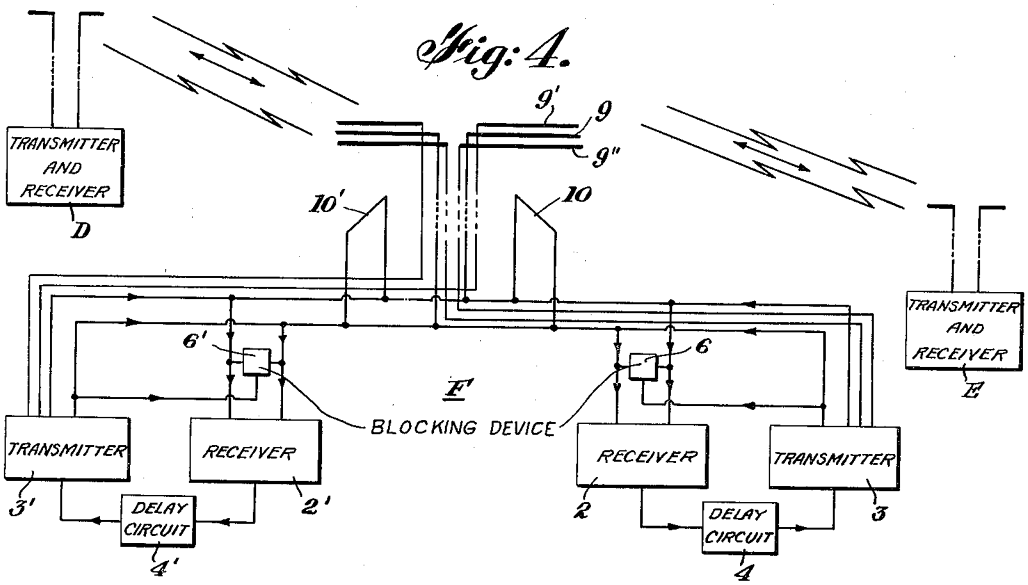
Fig. 4 shows a block circuit diagram of a pulse transmission system in which a different transmission frequency is assigned to each direction of transmission, but in which a single antenna may be used at a repeater station for both frequencies.

It is also possible to utilize a single antenna on a repeater station for bi-directional communication in the manner illustrated in the system shown in Fig. 4. In this figure, one end station D is adapted to transmit signals on one carrier frequency, while the other end station E is adapted to transmit signals on a second carrier frequency. The intermediate repeaters, one of which is indicated at F may include a single antenna 9 associated with an additional antenna or reflector 9' analogous to the additional antenna 8 in Fig. 1. As is well known in the art (see article by Messrs. E. M. Deloraine and E. Labin in Electrical Communication volume 22 page 91 year 1944) a pulse may be characterized by any one of the following factors: Amplitude as stated for instance in the United States Patent No. 2,266,401 to A. H. Reeves, December 16, 1941 or duration as stated for instance in the United States Patent No. 2,262,838 to E. M. Deloraine-A. H. Reeves, November 18, 1941 or wave shape as stated in W. A. Beatty, United States Patent No. 2,256,336 or frequency of the Carrier Wave carrying the pulse as stated in A. H. Reeves British Patent 541,665. It is obvious from the disclosure of the above mentioned patents that the frequency of occurrence of any one of the above mentioned characteristics could be utilized. It is also clear that any receiver for any of these types of pulses comprises necessarily appropriate pulse discriminating means. This single antenna 9 is adapted to receive both transmission frequencies from both directions. This antenna is connected to a pair of receiver transmitter units each of which may be similar to the single repeater unit described above in connection with Fig. 1, one unit being separately identified from the other by a "priming" of the reference numerals. In order to separate the signals at the two frequencies before they are impressed upon their respective receivers, one may utilize the well-known selective properties of transmission line at high frequencies, such as the frequencies visualized in the type of system described. At 10 and 10' are shown transmission networks in the form of short-circuited transmission lines serving respectively as short circuits for signals of the frequency which is assigned to the opposite transmitter receiver unit. For example, the transmission line network 10 may act as an effective short circuit for a frequency *f'* which is intended to be received by the receiver 2' and retransmitted by the transmitter 3'. While the transmission network 10' acts as an effective short circuit for signals of a frequency *f* intended to be received by the receiver 2 and retransmitted by the transmitter 3 in the opposite direction. The two short-circuiting networks 10, 10' may be spaced sufficiently from the transmission line leading to the antenna 9 to prevent short-circuiting of the antenna itself. As will be clear to those skilled in this art, other systems of filtering or frequency elimination may be used but the aforedescribed system is particularly applicable to the type of high frequency transmission systems contemplated. It will be further understood that the antenna 9 may be modified to produce a bi-directional radiation pattern in the same manner as the directional pattern is modified for one direction in the system shown in Fig. 1, or the amplitude of the transmitted pulses on different frequencies may be sequentially reduced in accordance with the system disclosed in Fig. 3 and previously described.

Figure 5:
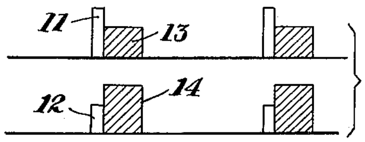
Fig. 5 shows various types of pulses which may be used in pulse systems transmitting in two directions on a single frequency.

It is also possible to utilize a single signaling frequency for both directions of transmission. The signals modulated by pulses for each direction are, in this case, defined by a particular type of modulation for each direction. For example, one may use a modulation by a simple pulse for one direction of transmission and a type of modulation by a double pulse for another direction of transmission. Complex forms of pulses having one common characteristic for each direction of transmission, such as the complex pulses described in U. S. patent to Beatty 2,298,922, or the French Patent 865,082 and 862,-598 may be utilized for this purpose. As an example of this aspect of the invention one may utilize, for example, two types of pulses such as are illustrated in Fig. 5. In this case, all of the pulses for transmission in one direction will be characterized by a complex pulse having an initial high amplitude pulse 11 and a smaller following portion 13, while the pulses to be transmitted in the opposite direction will be characterized by an initial low amplitude portion 12 and a following high amplitude portion 14.

Figure 6:
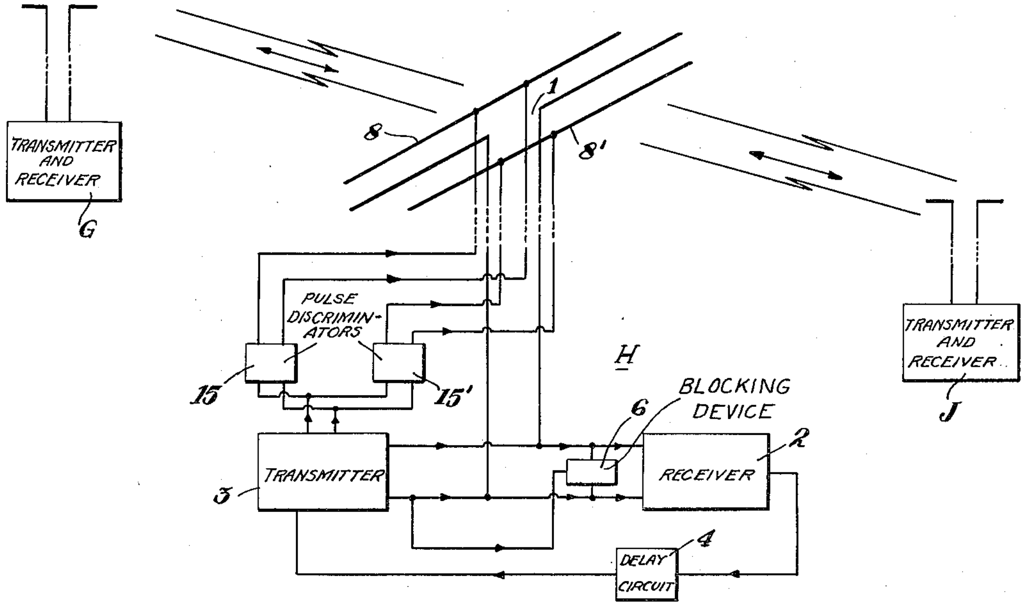
Fig. 6 is a block circuit diagram showing the details of a repeater to be used with the pulse system shown in Fig. 5.

Fig. 6 illustrates a two-directional system in which the direction of transmission is characterized by complex pulses of the type, for example, shown in Fig. 5. In this case, one end station G will, for example, transmit pulses of the character represented by 11, 13, while the other end station J will transmit pulses having a configuration 12, 14. The intermediate repeater station H in this case may be provided with a single receiver 2 actuating the transmitter 3 through the delay circuit 4 and means 6 may again be included for blocking the receiver 2. When the transmitter 3 is operated, the antenna 1 serves both the receiver 2 and the transmitter 3 and may be provided with oppositely positioned auxiliary antennae 8, 8' connected to the transmitter 3 through separate pulse discriminating circuits 15, 15'. Thus, if the transmitter 3 is energized from the receiver 2 by a pulse of one shape indicating one direction of transmission, one of the pulse discriminating circuits will permit this pulse to shape and actuate one of the direction-controlling auxiliary antennae, while if the transmitter 3 produces a pulse indicative of the other direction of transmission, the other pulse discriminating circuit will actuate the opposite direction-controlling antenna. Thus, it will be seen that repeater station H discriminates between the direction of transmission of the intelligence and re-transmits the signal only in the proper direction.

Figure 7:
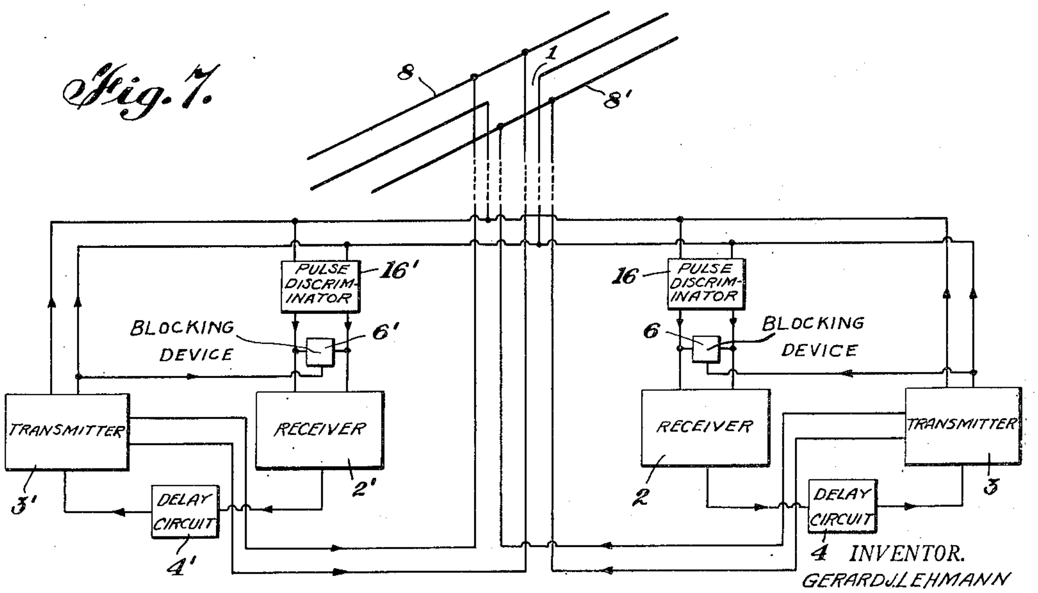
Fig. 7 is a block circuit diagram of another type of resistor which may be used in connection with the pulse system illustrated in Fig. 5.

If the type of pulse characterizing the direction of transmission is not suitable for reception and generation by the same receiver and transmitter circuits, each relay station may include a pair of transmitter receiver units, as shown in Fig. 7. In this case, one of the direction controlling auxiliary antenna is fed directly from one transmitter while the other antenna is fed from the other transmitter, the main antenna 1, as before, being commonly connected to both transmitters and both receivers. In this case, however, pulse discriminating circuits are included between the common antenna and each receiver, so that the receiver 2 only receives pulses of the type passed by the circuit 16, and as a result the transmitter 3 will only retransmit this type of pulse. Likewise, the receiver 2' only receives pulses of the type that are provided by the pulse discriminator 16', and as a result the transmitter 3' will only transmit this type of pulse.

Figure 8:
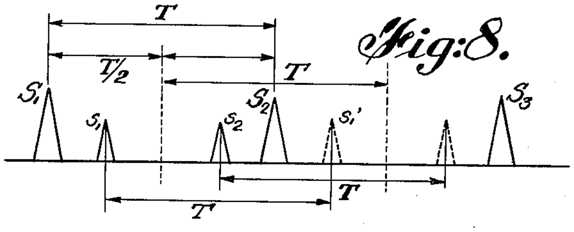
Fig. 8 illustrates a different type of modulation by pulses which may be used for two directional transmission on a single frequency.

It is also possible within the scope of the present invention to effect a two-directional transmission through a single antenna, in which the pulses for each direction are the same and in which the frequency for both directions is also identical. This system utilizes a system of pulses having a series of synchronization pulses of rigidly fixed spacing and a series of signaling pulses spaced from the corresponding synchronizing pulses in a variable manner. This is particularly possible if the synchronizing pulses and the signaling pulses are characterized by a fixed leading edge while the remaining portion of each pulse is repressed in a known manner. In Fig. 8, for example, I have shown a signaling pulse $s_1$ spaced from the synchronizing pulse $S_1$ at a distance less than T/2, T being the fixed interval between the synchronizing pulses $S_1$, $S_2$, $S_3$, etc. In the repeater station, the signaling pulses such as $s_1$ will be uniformly retarded by a time interval T which will cause the re-transmission of the pulses $s_1$ to $s'_1$, the intervals $S_1-s_1$ and $S_2-s'_1$ being equal, it is therefore the same signal which is being re-transmitted.

The pulses serving for signaling in the other direction of transmission will, on the contrary, be spaced from the synchronizing pulses by an interval greater than T/2, (for example $S_1-s_2$), assuming also that they are pulses with a fixed leading edge and a repressed main portion. However, considering them as pulses with a variable leading edge and fixed trailing edge (for example $s_2-S_2$) the spacing between the edges of the beginning and end is always less than T/2. This is unimportant provided that the synchronization pulses are always produced at the same instant as the pulses assigned to the two directions of transmission. The pulses $s_2$ also retarded by a time interval T will be re-transmitted in the opposite direction to the pulses $s_1$, always in the half period where there are no pulses $s_1$. This division of time by limiting the extent of modulation in duration, permits one to use a single receiver transmitter unit associated with a single antenna for each repeater station.

Figure 9:
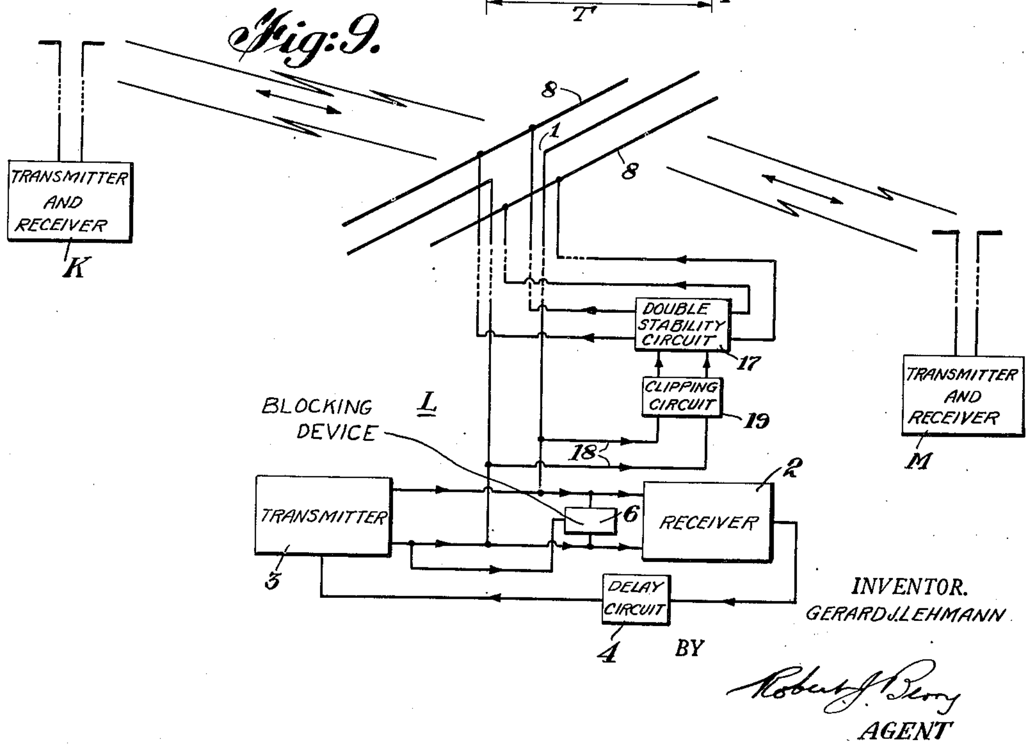
Fig. 9 is a block circuit diagram of a transmission system adapted for use with the pulse modulation illustrated in Fig. 8.

An example of such a repeater station is illustrated in Fig. 9 in which corresponding reference numerals for similar parts are used as in the prior figures. In this case, however, means such as a double stability circuit 17 is provided to commutate the auxiliary direction controlling antennae 8, 8' at each interval T/2 to change the directional pattern of the single antenna 1, in order to assure transmission alternatively in one direction and the other. The double stability circuit 17 may be connected to the antenna 1 through conductors 18 and can be made insensitive to the lower amplitude signaling pulses as through an intermediate clipping circuit 19. It is also contemplated that if desired, the synchronizing pulses may have a different common characteristic other than amplitude by which they are distinguished from the signaling pulses in which case the clipping circuit 19 will be replaced by a suitable corresponding pulse discriminating circuit. If these synchronizing pulses are locally generated the double stability circuit can be operated directly from the receiver.

In order to modify the bi-lateral directional pattern of the antenna, the use of conductors creating a radiation field opposed in phase to one portion of the field of the main antenna has been shown and described in connection with the foregoing systems. It would be understood, however, that the transmission systems contemplated are not limited to this method of modification of the directional diagram. In the case where an antenna has two joined reflectors assuring the two directions of radiation desired, with doublets at the interior of the reflectors, it is also possible to provide a suitable electric switch to supply one or the other doublets under the control of the transmitter pulses, or supply only one of the doublets during the short moments of functioning of the transmitter, for transmission in a single direction, or for the transmission in the desired direction or, alternatively disconnecting the doublet receiver during the instant of emission of the re-transmitted pulses. This apparatus could, in the latter case, be identified with the circuits 6, 6' shown for blocking the receiver during the time the transmitter is functioning. Other means of modifying the directional pattern may be utilized in accordance with the particular type of bi-directive antenna.

Accordingly, while I have described above the principles of my invention in connection with certain specific apparatus and various modifications thereof, it is to be clearly understood that this description is made only by way of example and not as a limitation on the scope of my invention as set forth in the objects.

What is claimed is:

1. In an intelligence transmission system, a source of intelligence characterizing pulsed signals, a receiver for said pulsed signals, and one or more repeaters intermediate said source and said receiver, each repeater including means receiving said pulsed signals, means retransmitting said pulsed signals, time delay means energizing said retransmitting means upon reception of the pulsed signals by said receiving means, and means at least at one repeater controlled by said retransmitting means and controlling said receiving means during retransmission to render said receiving means unresponsive to at least a portion of the energy of said retransmitting means.

2. The combination according to claim 1, in combination with blocking means at each repeater for preventing the actuation of the retransmitting means by the receiving means upon retransmission of the pulse signals by the retransmitting means.

3. An intelligence transmission system according to claim 1 for two-way transmission including the combination of one end station including a first transmitter serving as said source and generating intelligence-signifying pulses, each of said pulses having one common characteristic dimension, and a pulse receiver, a second end station including a second transmitter generating intelligence-signifying pulses, each of said pulses having a second common characteristic dimension, and a second pulse receiver corresponding to said receiver for pulsed signals, and wherein said one or more repeaters are positioned intermediate said end stations, each of said repeaters including means receiving both types of pulses, and means retransmitting both types of pulses.

4. An intelligence transmission system according to claim 3, in which said end stations are radio stations and in which each of said repeaters has a common antenna for said transmitting and reeciving means, in combination with means operated by said transmitting means for controlling the directional pattern of said antenna in accordance with the type of pulses impressed upon the receiving means.

5. An intelligence transmission system according to claim 1 wherein said first transmitter generates intelligence-signifying pulses spaced within a predetermined half interval between timed synchronizing pulses, and said second transmitter generates intelligence-signifying pulses spaced within the other half interval between similarly timed synchronizing pulses, and alternately operable means for varying the directional pattern of said antenna in one direction or the other, and means responsive to the timing of the transmitted pulses in one or the other of said half intervals for actuating one of said pattern-varying means.

6. An intelligence transmission system according to claim 5, in which each repeater includes means for preventing the actuation of the transmitting means by the receiving means upon retransmission of the pulsed signals by the transmitting means.

7. In an intelligence transmission system, a radio transmitter of pulse modulated signals, a radio receiver for said pulse modulated signals and one or more repeaters intermediate said transmitter and said receiver, each repeater including means receiving said pulse modulated signals, means retransmitting said pulsed signals, time delay means energizing said retransmitting means upon reception of the pulsed signals by said receiving means, a common antenna for said receiving and retransmitting means, and means actuated by said retransmitting means for controlling the directional pattern of said antenna.

8. The combination according to claim 7, in combination with means at each repeater for preventing the actuation of the retransmitting means by the receiving means upon retransmission of the pulse signals by the retransmitting means.

9. A radio repeater including, in combination, a transmitter, a receiver, a common antenna for said transmitter and receiver, time delay means energizing said transmitter in accordance with signals impressed upon said receiver, means for preventing energization of the transmitter by the receiver whenever the transmitter is operating and means actuated by said transmitter for controlling the directional pattern of said antenna.

10. A radio repeater according to claim 9 adapted to discriminate between and retransmit pulse modulated signals in which the pulses received from one direction have one common characteristic dimension and the pulses received from another direction have a second common characteristic dimension, wherein said means controlling the directional pattern of said antenna comprises means controlling the directional pattern in accordance with the dimensional characteristics of the pulses energizing said receiving means.

11. The combination according to claim 10, in combination with means at each repeater for preventing the actuation of the transmitting means by the receiving means upon retransmission of the pulsed signals by the transmitting means.

12. The combination according to claim 10, in which the transmitting means comprises a single transmitter, the receiving means a single receiver, and said last means a pair of pulse-discriminating circuits intermediate said transmitter and said direction-controlling means.

13. The combination according to claim 10, in which said transmitting and receiving means comprises a pair of transmitter-receiver units each respectively interconnected by delay and actuation preventing means, and in which said last means includes separate pulse-discriminating circuits between the common antenna and the individual receivers.

14. In a two-way intelligence transmission system, the combination of one end station including a transmitter generating pulsed intelligence signifying signals having one common predetermined characteristic, and a receiver adapted to receive pulsed intelligence signifying signals of a second common predetermined characteristic, a second end station including a transmitter generating pulsed intelligence signifying signals having said second common characteristic, and a receiver adapted to receive pulsed intelligence signifying signals of the said first common characteristic, and one or more repeaters intermediate said end stations, each of said repeaters including means receiving and transmitting pulsed signals of both characteristics, and means dependent on said transmitting means and controlling said receiving means during transmission to render said receiving means unresponsive to at least a portion of the energy of said transmitting means.

15. The combination according to claim 14, in which the transmitters and receivers of said end stations are radio transmitters and receivers, in combination with a common antenna for the receiving and transmitting means of each repeater, and means at each repeater for modifying the directional pattern of said antenna in accordance with the characteristic of the signal retransmitted by said transmitting means.

16. A system according to claim 14, in which the receiving means at each repeater includes a pair of receivers, means preventing response of one of said receivers to pulsed signals having one of said characteristics, means preventing response of the other of said receivers to pulsed signals having the second characteristic, and in which the transmitting means includes a pair of transmitters, one of which generates pulsed signals having the one characteristic and the other of which generates pulsed signals having the second characteristic, in combination with first time delay means energizing the first transmitter from the other receiver, means preventing actuation of the first transmitter by the other receiver when said first transmitter is operating, second time delay means energizing the other transmitter from the first receiver, and means preventing actuation of the other transmitter by the first receiver whenever said other transmitter is operated.

17. In an intelligence transmission system, a transmitter generating pulsed signals of a predetermined amplitude, a receiver, and one or more repeaters intermediate said transmitter and said receiver, each repeater including receiving means responsive to pulsed signals, means retransmitting pulsed signals of less amplitude than those impressed upon said receiving means from said transmitter or a prior repeater, time delay means energizing said retransmitting means upon reception of the pulsed signals by said receiving means, and means for rendering said receiving means unresponsive to signals of the lower amplitude of said retransmitting means.

18. In a two-way intelligence transmission system, the combination of one end station including a transmitter generating pulsed signals on a carrier of one predetermined frequency, and a receiver tuned to a carrier of a second predetermined frequency, a second end station including a transmitter generating pulsed signals on a carrier of said second frequency, and a receiver tuned to the carrier of said first predetermined frequency, and one or more repeaters intermediate said end stations, each repeater including two transmitting-receiving units, one of which is operable on one of said frequencies and the other on the second of said frequencies, each of said units comprising a receiver for pulse-modulated signals, means retransmitting said pulse-modulated signals, time delay means energizing said retransmitting means upon reception of the pulse signals by said receiving means, and means preventing the actuation of the transmitting means by the receiving means upon retransmission of the pulse-modulated signals by the retransmitting means.

19. A two-way repeater, including in combination, a pair of transmitter receiver units, one unit comprising first means adapted to receive pulse-modulated signals, first means transmitting pulse-modulated signals on a first predetermined carrier frequency, time delay means energizing said first transmitting means from said first receiving means, and means preventing the actuation of said first transmitting means by said first receiving means whenever said first transmitting means is operating, the other unit comprising second means adapted to receive pulse-modulated signals, second means transmitting pulse-modulated signals on a second predetermined carrier frequency, time delay means energizing said second trasmitting means from said second receiving means, and means preventing the actuation of said second transmitting means by said second receiving means whenever said second transmitting means is operating, means preventing operation of said first receiving means by signals of the second carrier frequency, and means preventing operation of said second receiving means by signals of the first carrier frequency.

20. The combination according to claim 19, in combination with a common antenna for said pair of transmitter receiver units, and in which said last two means include a pair of transmission lines, one leading from said antenna to one of said units and the other leading from said antenna to the other of said units, and a pair of networks, one connected across each transmission line, one of said networks being tuned to short-circuit its corresponding transmission line for one of said carrier frequencies, and the other being tuned to short-circuit its corresponding transmission line for the other carrier frequency.

GERARD J. LEHMANN.

REFERENCES CITED

The following references are of record in the file of this patent:

UNITED STATES PATENTS

| Number | Name | Date |
|---|---|---|
| 1,668,674 | Espenschied et al. | May 8, 1928 |
| 2,017,126 | Kroger | Oct. 15, 1935 |
| 2,276,497 | Kroger | Mar. 17, 1942 |
| 2,421,016 | Deloraine | May 27, 1947 |

FOREIGN PATENTS

| Number | Country | Date |
|---|---|---|
| 521,139 | Great Britain | May 13, 1940 |